March 20, 1934.   G. ZAPF   1,951,687
METHOD OF STRETCHING WIRE ROPES
Filed Oct. 13, 1930

G. Zapf Inventor
By: Marks & Clerk

Patented Mar. 20, 1934

1,951,687

UNITED STATES PATENT OFFICE 1,951,687

METHOD OF STRETCHING WIRE ROPES

Georg Zapf, Cologne, Germany, assignor to Felten & Guilleaume Carlswerk Actien-Gesellschaft, Cologne-Mulheim, Germany Application October 13, 1930, Serial No. 488,463
In Germany October 17, 1929

2 Claims. (Cl. 117—16)

In my U. S. Patent No. 1,822,189, issued Sept. 8, 1931, I have described a method of reducing the extension of wire ropes, more particularly ropes employed in the erection of bridges, under the load to which they are subjected after erection, said method consisting in stretching the wire ropes by applying forces to subject the ropes to tensile stresses and tightly wrapping the ropes while in the stretched state with a helical wire bandage before applying the rope to the purpose for which it is intended.

The present invention has for its object to enable the stretching of the wire ropes to be effected in cases in which owing to lack of space, the rope cannot be stretched over its entire length at one time.

In accordance with the present invention, the stretching is effected by securing clamps to the ends of successive individual sections of the rope and stretching each section successively by applying tensional forces to the said clamps. The clamps are pushed over the rope and are pressed firmly on to the rope by means of threaded nuts. After the tensional forces are caused to act on these clamps, that is after each stretching operation, the clamps are pushed along to the ends of the next section of the rope to be stretched. The clamps must be constructed in such a manner that they can adapt themselves to a reduction in the diameter of the rope when the latter is stretched, without becoming loose. Examples of such clamps are shown in Figs. 1–4 of the accompanying drawing.

Figure 1:
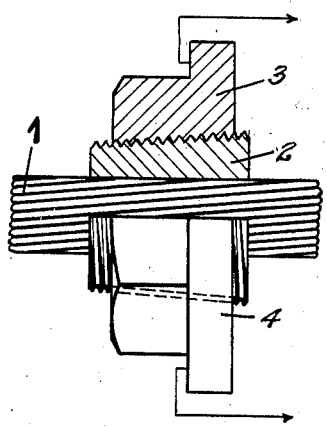
Fig. 1 shows a side view partly in section of a constructional form of clamp and Fig. 2 is a plan view.
Figure 2:
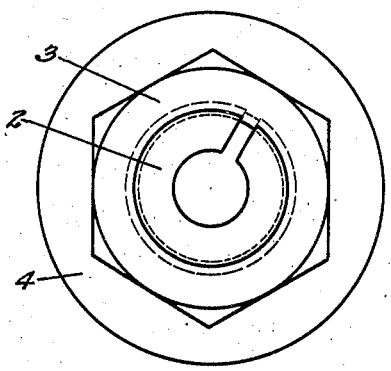

The clamp shown in Figs. 1 and 2 comprises a slotted, externally conical sleeve 2 having an external screw thread and a nut 3 which is screwed over the sleeve 2. The clamp is slipped over the rope 1 and the tension forces for stretching the rope act on a flange-like run 4 with which the nut 3 is provided.

Figure 3:
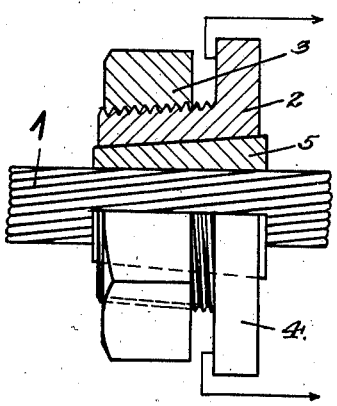
Fig. 3 shows a side view, partly in section of a second constructional form of clamp
Figure 4:
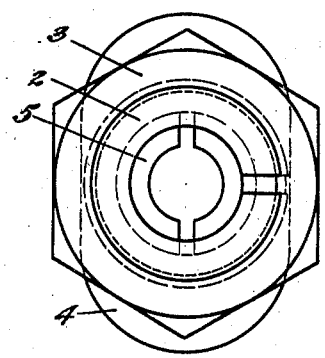
Fig. 4 is a plan view.

The constructional form of clamp shown in Figs. 3 and 4 comprises an externally conical two-part sleeve 8 against the external surface of which a conically bored slotted sleeve 6 provided with a screw thread is firmly pressed by means of a nut 7. During the stretching of the rope 1, the tension forces act on the flange-like rim 8 of the sleeve 6. This clamp, owing to the portion thereof which is placed directly on the rope being constructed as a two-part conical sleeve 5, has the property of accommodating itself to the reduction in diameter of the rope during the stretching to a particularly advantageous degree.

In the case of wire ropes stretched in sections in accordance with the present invention, the separate sections may be wrapped in a known manner with one or more bandages of wires or bands, while the rope is in tension, for the purpose of reducing the extension which will occur when the rope is subsequently under its working load.

Figure 5:
Fig. 5 shows a longitudinal view of a portion of a wire rope with clamps thereon to illustrate the stretching of a wire rope by the method according to the invention.

Referring to Fig. 5 which illustrates by way of example the stretching of a wire rope in two sections at the ends of the left-hand section of the rope, clamps 9 and 10 are applied on which the tensile stretching forces $P_1$ and $P_2$ act. After the left-hand half of the rope has been stretched under the action of these forces a bandage is applied thereto while the rope is still under the action of the said tensile forces. The clamps 9 and 10 at the ends of the left-hand half of the rope are then removed and applied to the ends of the right-hand half of the rope, which is then treated in the same way as the left hand half of the rope. In this state the rope is erected in its working position and subjected to the working load, after which the bandages may be removed without further extension of the rope taking place under the action of the working load.

What I claim is:

1. A method of reducing the extension of wire ropes under their working loads, by stretching the finished wire rope, before being applied to the particular work for which it is to be used, consisting in applying clamps to the ends of successive individual sections of the rope and stretching each section successively by applying tensional forces to the said clamps.

2. A method of reducing the extension of wire ropes under their working loads, by stretching the finished wire rope, before being applied to the particular work for which it is to be used, consisting in applying clamps to the ends of successive individual sections of the rope, stretching each section successively by applying tensional forces to the said clamps and tightly wrapping the individual sections while subjected to the action of said tensile forces with a helical metal wire bandage.

G. ZAPF.